(12) United States Patent
Hansen

(10) Patent No.: US 11,290,521 B2
(45) Date of Patent: Mar. 29, 2022

(54) TARGET WEBPAGE PERFORMANCE

(71) Applicant: Oath Inc., New York, NY (US)

(72) Inventor: Richard Randall Hansen, San Jose, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/459,311

(22) Filed: Jul. 1, 2019

(65) Prior Publication Data

US 2019/0327291 A1    Oct. 24, 2019

Related U.S. Application Data

(63) Continuation of application No. 15/078,163, filed on Mar. 23, 2016, now Pat. No. 10,341,417.

(51) Int. Cl.
| | | |
|---|---|---|
| *H04L 29/08* | (2006.01) | |
| *H04L 29/06* | (2006.01) | |
| *G06F 16/957* | (2019.01) | |
| *H04L 67/06* | (2022.01) | |
| *H04L 67/02* | (2022.01) | |
| *H04L 69/04* | (2022.01) | |
| *H04L 67/01* | (2022.01) | |

(Continued)

(52) U.S. Cl.
CPC .......... *H04L 67/06* (2013.01); *G06F 16/9574* (2019.01); *H04L 67/02* (2013.01); *H04L 67/125* (2013.01); *H04L 67/20* (2013.01); *H04L 67/38* (2013.01); *H04L 67/42* (2013.01); *H04L 69/04* (2013.01)

(58) Field of Classification Search
CPC ......... H04L 65/00–80; H04L 67/00–42; H04L 69/00–04; H04L 16/957–9574
See application file for complete search history.

(56) References Cited

U.S. PATENT DOCUMENTS 6,438,592 B1 *  8/2002  Killian .................... H04L 41/22
                                                       709/203
8,117,306 B1 *  2/2012  Baumback .......... H04L 43/0811
                                                       709/224

(Continued)

OTHER PUBLICATIONS

Bernstein, Meet the Man Who Invented the Browser Tab, 2014, BuzzFeed, pp. 1-6 (Year: 2014).*

*Primary Examiner* — Clayton R Williams
(74) *Attorney, Agent, or Firm* — Cooper Legal Group, LLC

(57) ABSTRACT

One or more computing devices, systems, and/or methods for generating a recommendation for increasing loading time performance of a target webpage are provided. For example, a third party window, specifying a target webpage as a source, is inserted into a webpage. The webpage is provided to a browser that displays the webpage and loads the target webpage into the third party window. Resource timing data, associated with loading the target webpage into the third party window, is retrieved. Loading time performance of the target webpage is measured based upon the resource timing data. A recommendation for increasing loading time performance of the target webpage is generated. In an example, an action such as a resource allocation change for hosting the target webpage, compression of an image of the target webpage, a connection reduction of files connected to by the target webpage, etc. is performed based upon the recommendation.

20 Claims, 14 Drawing Sheets

(51) Int. Cl.
   *H04L 67/53*     (2022.01)
   *H04L 67/125*    (2022.01)
   *H04L 67/131*    (2022.01)

(56) References Cited

U.S. PATENT DOCUMENTS

| | | | |
|---|---|---|---|
| 2014/0136952 A1* | 5/2014 | Zhu | G06F 9/5072 |
| | | | 715/234 |
| 2015/0156151 A1* | 6/2015 | Sheory | H04L 51/10 |
| | | | 715/236 |
| 2016/0134934 A1* | 5/2016 | Jared | G06Q 30/0203 |
| | | | 725/14 |

* cited by examiner

TARGET WEBPAGE PERFORMANCE

CROSS REFERENCE TO RELATED APPLICATION

This application claims priority to and is a continuation of U.S. application Ser. No. 15/078,163, filed on Mar. 23, 2016, entitled "TARGET WEBPAGE PERFORMANCE", which is incorporated herein.

BACKGROUND

Many webpages and applications may link to content provided by an external content provider. In an example, a social network post of a social network app may comprise a link to a landing page for signing up for a lawn care service. In another example, a hotel webpage may comprise a link to a car rental webpage and another link to an entertainment webpage. A user's experience with a webpage or application may be dependent upon how the user's experience is with content linked to by the webpage or application. For example, the user may have an overall poor experience with the hotel webpage if the car rental webpage takes an inordinately long time to load. Also, if the hotel webpage has a monetary interest in users following through with renting cars through the car rental webpage, then both the hotel webpage and the car rental webpage have an interest in the car rental webpage performing well, such as loading quickly and without errors.

Unfortunately, a content provider, of the webpage or application that links to content of the external content provider, may be unable to measure loading time performance of the linked to content from a user point of view (e.g., how long the content takes to load for a particular user using a particular device). Otherwise, obtaining explicit approval from the external content provider to insert script into the content for measuring loading time performance may be impractical and not workable from a scale perspective. Thus, there is a need for a way for content providers to be able to measure the loading time performance of content, such as content hosted by a third party content provider.

SUMMARY

In accordance with the present disclosure, one or more computing devices and/or methods for generating a recommendation for increasing loading time performance of a target webpage are provided. For example, a third party window, such as an iFrame or web view, may be inserted into a webpage (e.g., a videogame webpage). It may be appreciated that the third party window may be inserted into any type of content such as application. The third party window may have a hidden style attribute so that users accessing the webpage do not see the third party window. The third party window may specify that a target webpage is a source (e.g., an electronics store webpage). It may be appreciated that the third party window may specify any type of content as the source. A browser or other computing environment of a client device may be provided with access to the webpage (e.g., a user may navigate to the videogame webpage). Accordingly, the browser may load the electronics store webpage into the third party window, and resource timing data associated with the loading may be collected (e.g., connection timing data, domain lookup timing data, a duration, an entry type, a fetch start, an initiator type, a uniform resource locator (URL) name, redirect timing data (e.g., the time it takes for a browser visiting a first URL to be redirected to a second URL), a request start, response timing data (e.g., a time that it takes for a webpage to load), secure connection timing data, or any other request/response lifecycle data). Because the third party window may be hidden from view, the user may interact with the videogame webpage without noticing the electronics store webpage being loaded into the third party window for resource timing data measurement purposes. In another example where a prerender link tag is inserted into the webpage instead of the third party window, the electronics store webpage may be prerendered, and the resource timing data may be obtained based upon the prerendering.

The resource timing data, associated with the target webpage being loaded, may be retrieved from the browser (e.g., received back within a beacon). The resource timing data may be evaluated to measure loading time performance of the target webpage (e.g., resource timing data, from various client devices accessing the videogame webpage where the electronics store webpage is loaded into third party windows, is aggregated together to determine an average load time or other loading time performance indicators for the electronics store webpage). Responsive to the loading time performance not exceeding a threshold (e.g., the load time for the electronics store webpage exceeds 2 seconds or any other value), a recommendation for increasing the loading time performance of the target webpage may be generated. In this way, an action (e.g., an increase in hardware resources used to provide the electronics store webpage to client devices; compression of an image within the electronics store webpage; a connection reduction where one or more script files connected to by the electronics store webpage are merged; etc.) may be performed based upon the recommendation. In an example, loading time performance of the target webpage may be reevaluated after the action is performed (e.g., an iterative process of performing actions and measuring loading time performance may be performed).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

Figure 1:
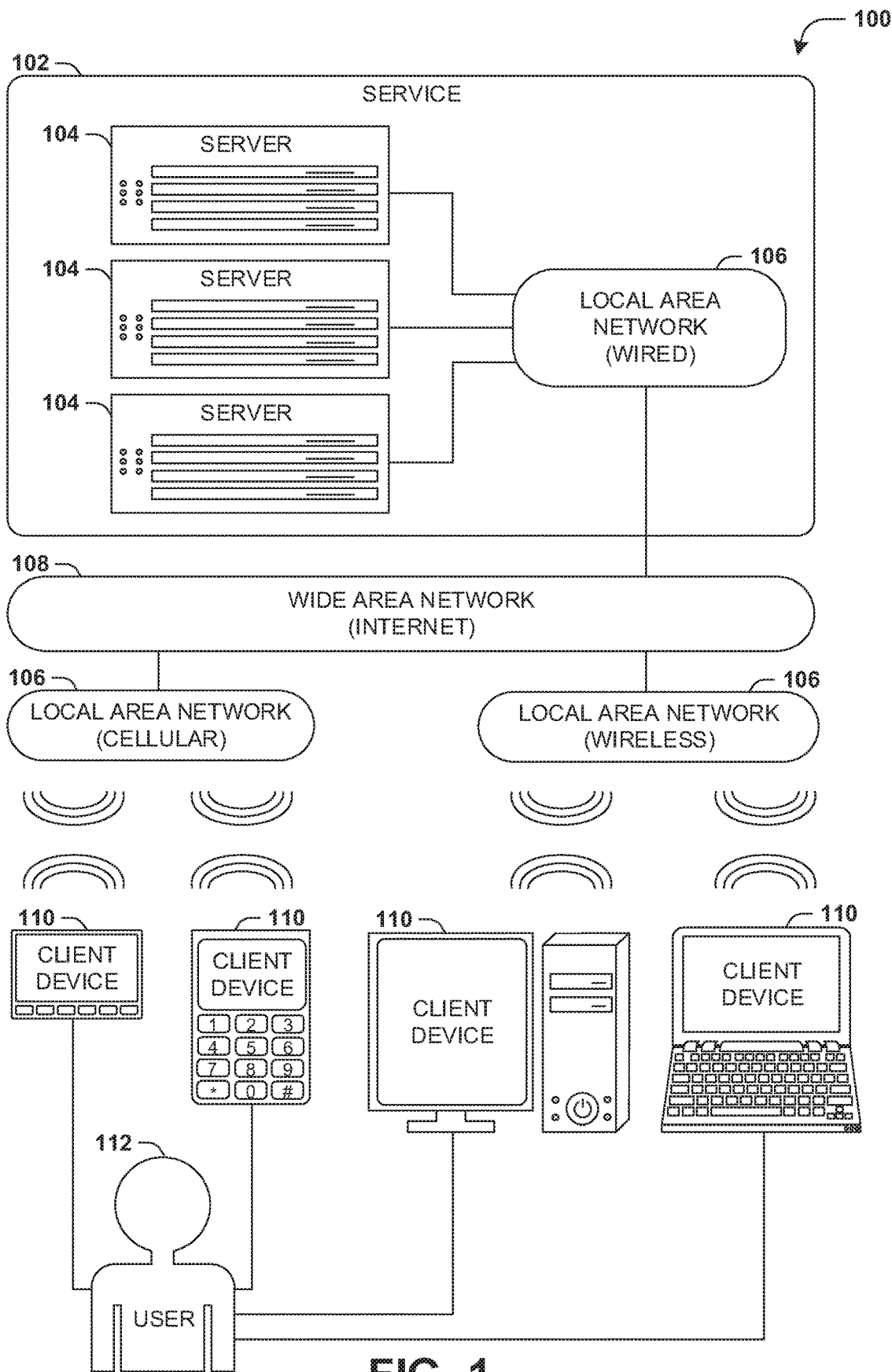
FIG. 1 is an illustration of a scenario involving various examples of networks that may connect servers and clients.

The following provides a discussion of some types of computing scenarios in which the disclosed subject matter may be utilized and/or implemented.
1.1. Networking
FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
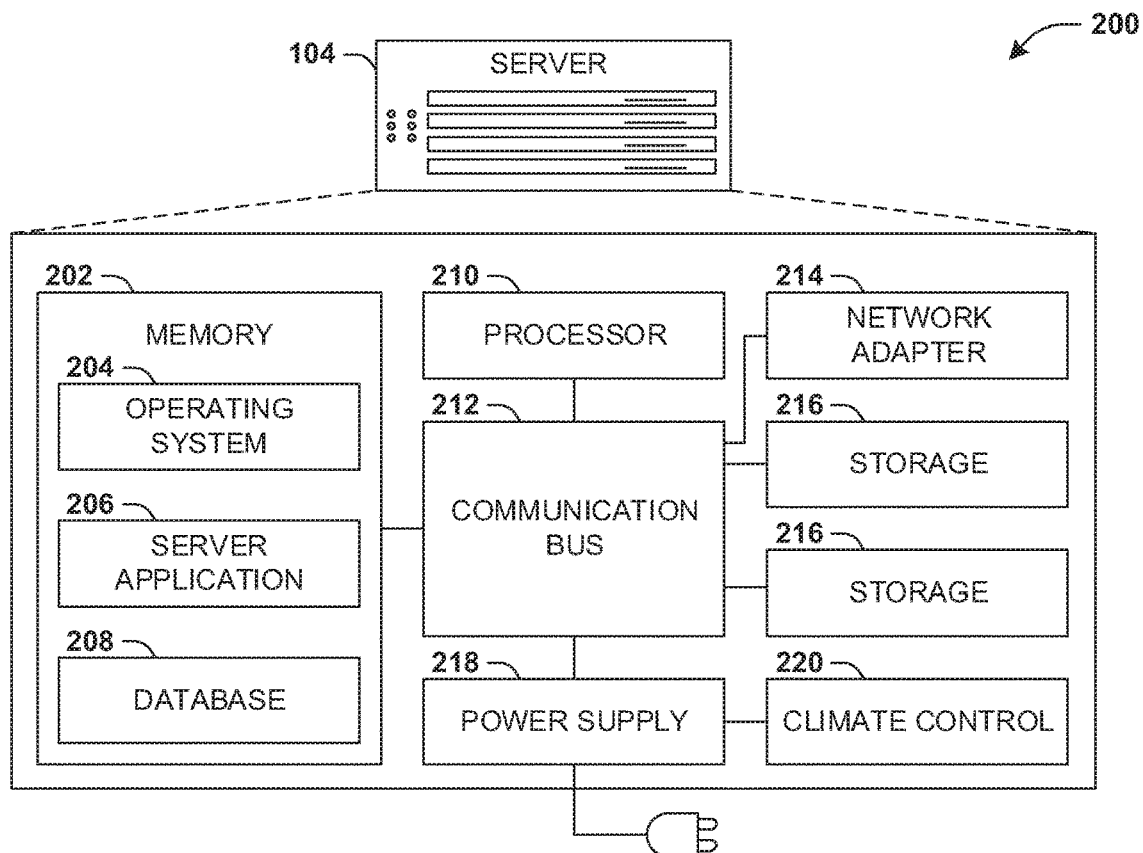
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
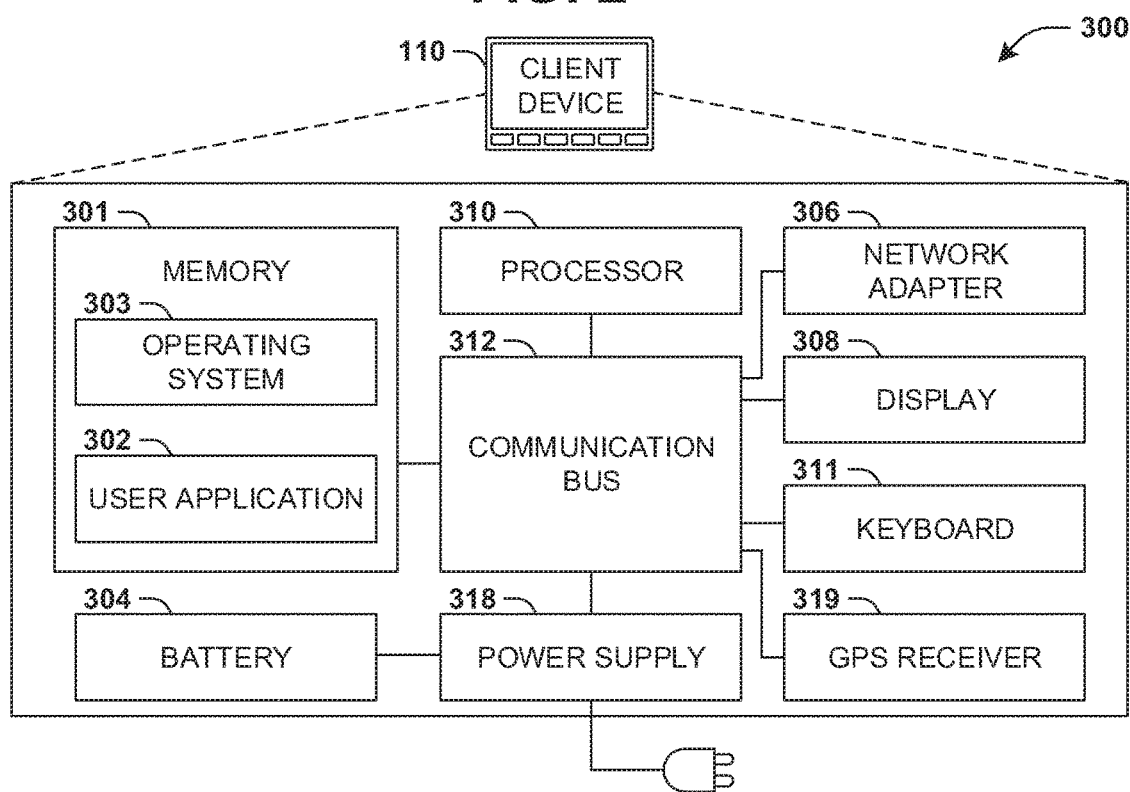
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time)

may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a recommendation for increasing loading time performance of a target webpage are provided. A webpage or other content may link to a target webpage (e.g., a vacation webpage may link to a car rental webpage). It may be advantageous for a content provider of the webpage to be able to measure loading time performance of the target webpage so that recommendations may be generated and/or actions may be performed to improve the loading time performance of the target webpage. Accordingly, a third party window (e.g., an iFrame, a web view, etc.) and/or a prerender link tag may be inserted into the webpage for loading or prerendering the target webpage when a user navigates to the webpage. In this way, resource timing data of the target webpage may be acquired and used to generate recommendations and/or perform actions for improving the loading time performance of the target webpage.

The ability to measure loading time performance of the target webpage, allows for actions to be taken that will more efficiently utilize hardware resources for providing clients with access to the target webpage (e.g., additional servers, bandwidth, computer processing unit (CPU) cycles, memory, or other resources may be allocated to hosting the target webpage, or hardware resources may be deallocated for other purposes if the target webpage loads faster than desired). In this way, bandwidth and computing resources may be efficiently utilized for hosting the target webpage so that a user's experience is improved (e.g., the user may have a better experience if the user is not waiting 10 seconds for the car rental webpage to load, and thus an increase in computing resource allocation may be beneficial; the user's experience may remain the same even though some computing resources are reallocated for other purposes than hosting the target webpage; etc.). In another example, the target webpage may be modified (e.g., an image may be compressed, files connected to by the target webpage may be merged, etc.) to increase loading time performance of the target webpage. In another example, hosting of the target webpage may be transitioned to a content delivery network or cloud provider for increased loading time performance.

Figure 4:
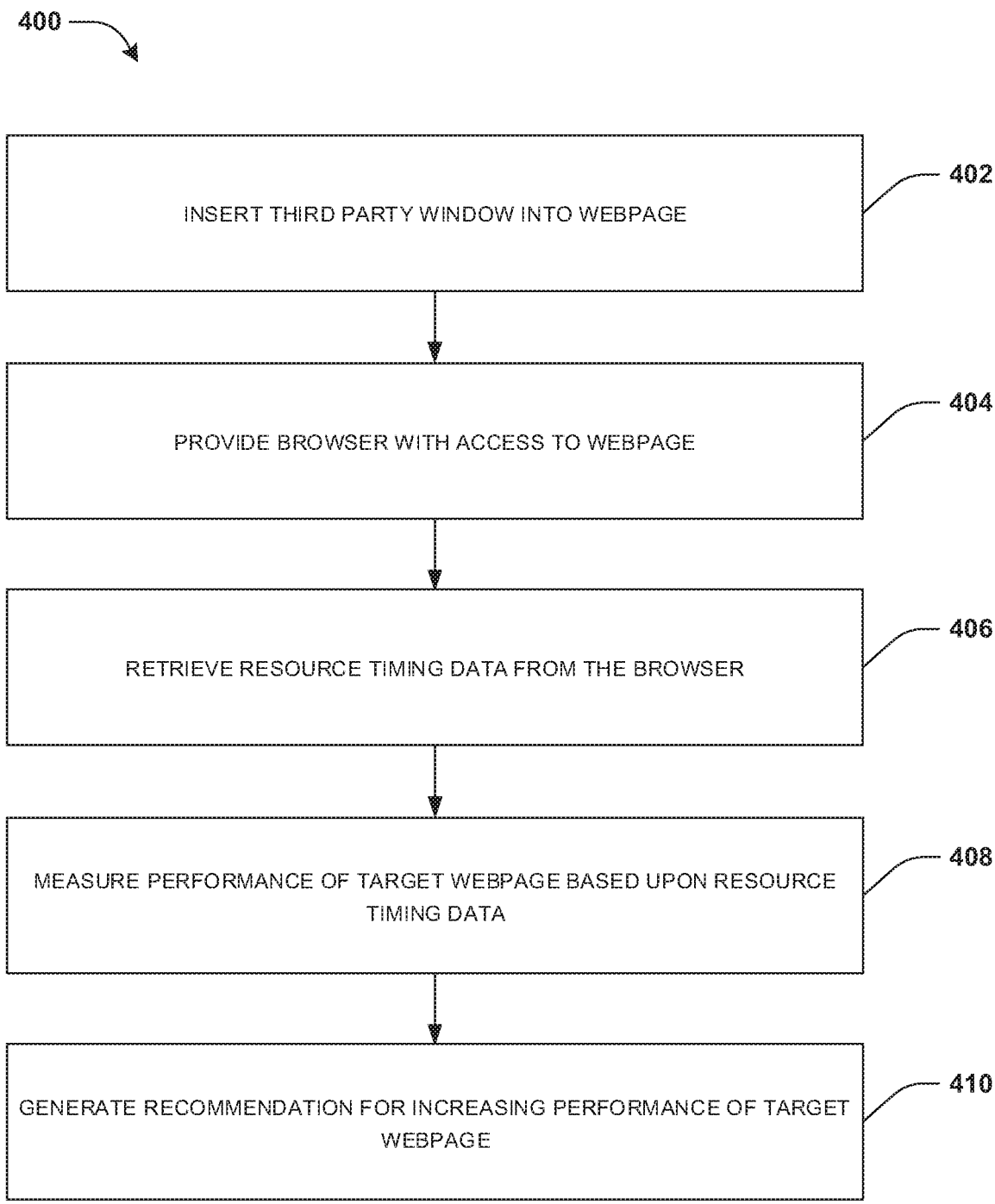
FIG. 4 is a flow chart illustrating an example method for generating a recommendation for increasing loading time performance of a target webpage.

An embodiment of generating a recommendation for increasing loading time performance of a webpage is illustrated by an example method 400 of FIG. 4. At 402, a third party window (e.g., an iFrame or web view) may be inserted into a webpage (e.g., the third party window may be inserted with a hidden style property into a garden club webpage). It may be appreciated that the third party window may be inserted into any type of content, such as an app. The third party window may specify a target webpage as a source (e.g., a tree store webpage). It may be appreciated that the third party window may specify any type of content, such as an app, an image, a video, a web service, etc., as the source.

At 404, a browser of a client device may be provided with access to the webpage (e.g., or any type of computing environment or interface capable of accessing the content within which the third party window was inserted). The browser may display the garden club webpage to a user, and may load the tree store webpage into the third party window. Because the third party window may not be visible to the user, the tree store webpage may be loaded without disrupting the user. The browser, such as a resource timing application programming interface (API), may be used to collect resource timing data associated with the target webpage being loaded into the third party window (e.g., a window resource timing entry, for a uniform resource locator (URL) of the target webpage, may comprise the resource timing data). In an example where a timing allow origin header is not set for the target webpage, merely a start time and an end time for a request/response lifecycle for the target webpage may be collected as the resource timing data. In an example where a timing allow origin header is set for the target webpage, connection timing data, domain lookup timing data, a duration, an entry type (e.g., "resource"), a fetch start, an initiator type (e.g., "iFrame"), a URL name, redirect timing data, a request start, response timing data, or secure connection timing data may be collected as the resource timing data.

At 406, the resource timing data may be retrieved from the browser. For example, the browser may provide the resource timing data back through a beacon to a content provider of the webpage. At 408, loading time performance of the target webpage may be measured based upon the resource timing data. In an example, a plurality of resource timing data may be received from browsers of client devices that have loaded the target webpage for the purpose of collecting resource timing data, and the plurality of resource timing data may be used to measure the loading time performance of the target webpage. In an example, the loading time performance may correspond to a load time for the target webpage and/or any other metric.

At 410, responsive to the loading time performance not exceeding a threshold (e.g., the load time being greater than a threshold such as 2 seconds or any other value), a recommendation for increasing the loading time performance of the target webpage may be generated. For example, the recommendation may comprise a hardware resource allocation change for providing the target webpage to client devices (e.g., an amount of additional bandwidth, CPU cycles, memory, servers, etc.), an image compression recommendation for an image within the target page, a connection reduction recommendation to merge one or more files connected to by the target webpage (e.g., merger of script files into a single file), a content delivery network recommendation for hosting the target webpage, and/or any other recommendation to perform an action to decrease loading time of the target webpage. In this way, an action may be implemented, such as to adjust a resource allocation for serving the target webpage to browsers, based upon the recommendation. In an example where the loading time performance exceeds the threshold, the recommendation may be created for deallocating resources used for hosting the target webpage so that such resources may be used for other purpose.

In an example, responsive to receiving an indication that the action was performed in response to the recommendation (e.g., an addition of 2 new servers for hosting the target webpage), new loading time performance of the target webpage may be measured based upon new resource timing data generated from the target webpage being loaded into a new instance of the third party window. The new loading time performance may be compared with the loading time performance to create an updated recommendation. The updated recommendation may specify that the action should be undone (e.g., the additional servers did not improve loading time of the target webpage), that the action should be retained (e.g., the additional servers improved the loading time of the target webpage), and/or that an additional action should be performed (e.g., an image should be compressed within the target webpage).

In an example, second loading time performance of a second target webpage (e.g., a landscaping company webpage) may be measured based upon second resource timing data generated from the second target webpage being loaded into instance of a second third party window by client devices. In this way, the loading time performance of the target webpage (e.g., the tree store webpage) and the second loading time performance of the second target webpage (e.g., the landscaping company webpage) may be compared to generate a new recommendation (e.g., the landscaping company webpage may outperform the tree store webpage, and thus the tree store webpage may be provided with a recommendation with how to improve loading time performance). In an example, a graph, illustrating loading time performance of different target webpages, may be constructed and/or provided to content providers of the target webpages.

Figure 5A:
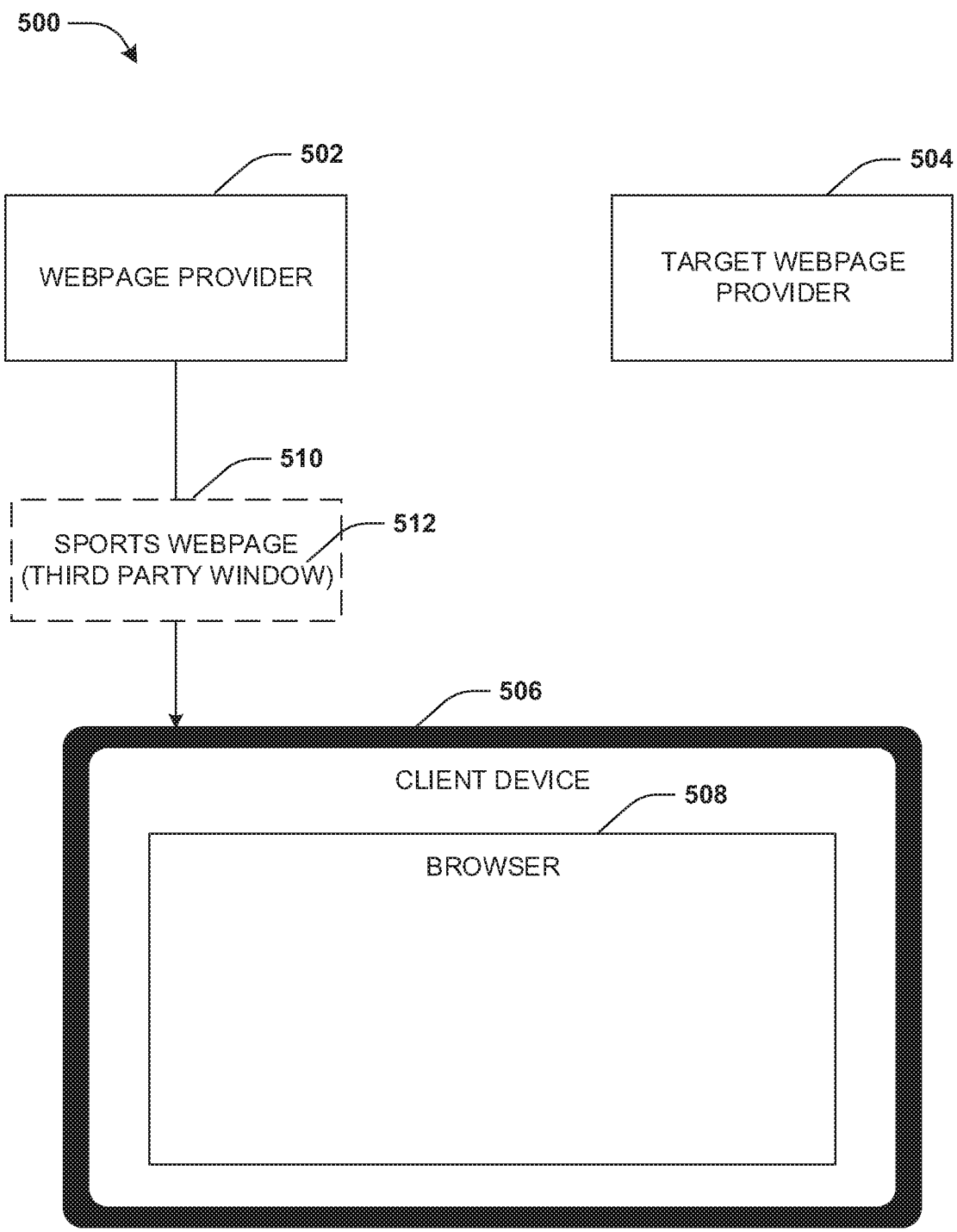
FIG. 5A is a component block diagram illustrating an example system for generating a recommendation for increasing loading time performance of a target webpage, where a browser accesses a sports webpage.

FIGS. 5A-5I illustrate examples of a system for generating a recommendation for increasing loading time performance of a target webpage. FIG. 5A illustrates a client device 506 hosting a browser 508. A user of the client device 506 may use the browser 508 to access a sports webpage 510 hosted by a webpage provider 502. The sports webpage 510 may comprise a third party window 512 specifying that an equipment webpage 512, hosted by a target webpage provider 504, is a source. In this way, the webpage provider 502 provides the sports webpage 510, comprising the third party window 512, to the client device 506 for display through the browser 508.

Figure 5B:
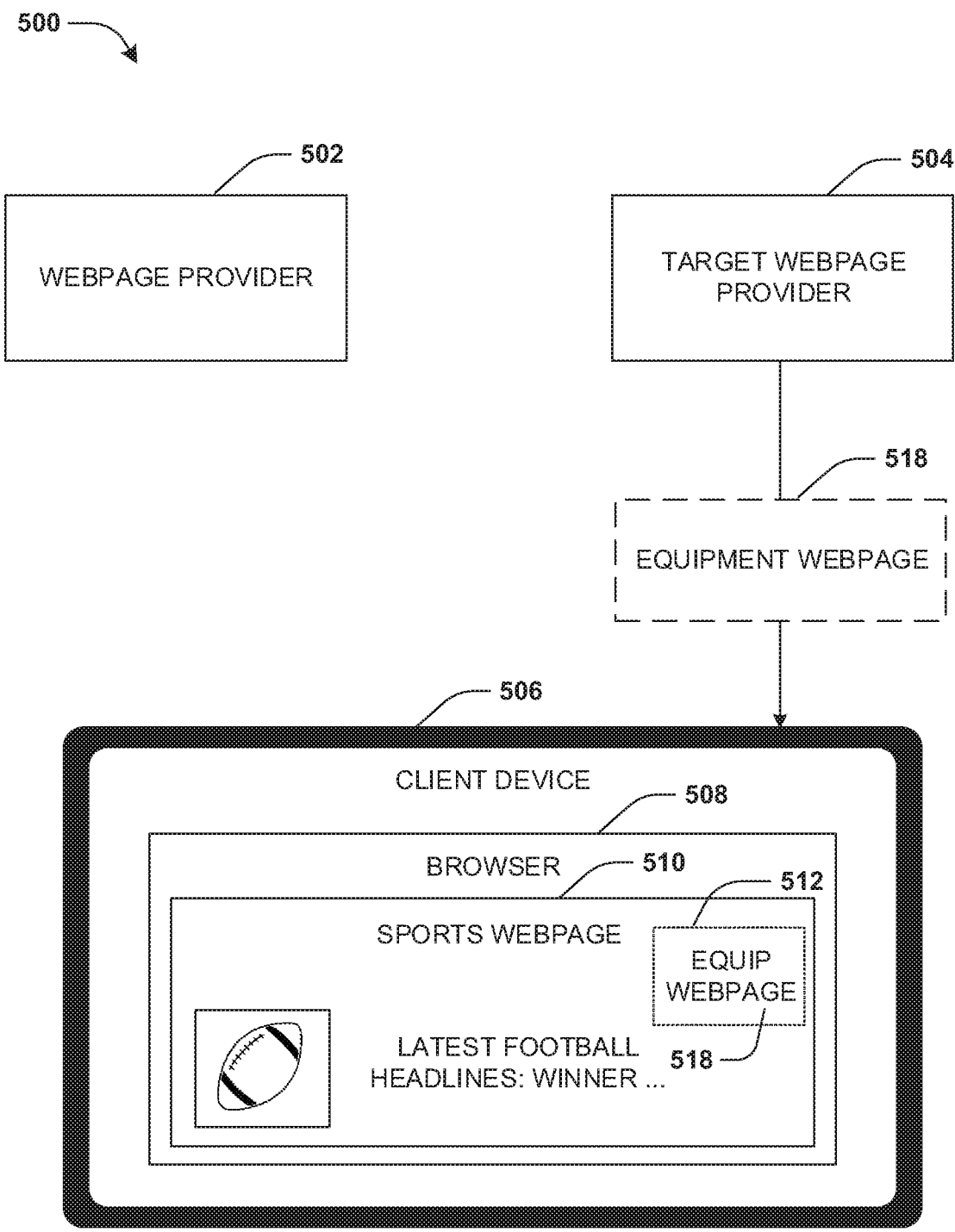
FIG. 5B is a component block diagram illustrating an example system for generating a recommendation for increasing loading time performance of a target webpage, where a browser loads an equipment webpage into a third party window.

FIG. 5B illustrates the browser 508 displaying the sports webpage 510. The browser 508 may retrieve the equipment webpage 518 from the target webpage provider 504, and may load the equipment webpage 518 into the third party window 512. In an example, the third party window 512 may not be visible to the user, and thus the user may not see the equipment webpage 518.

Figure 5C:
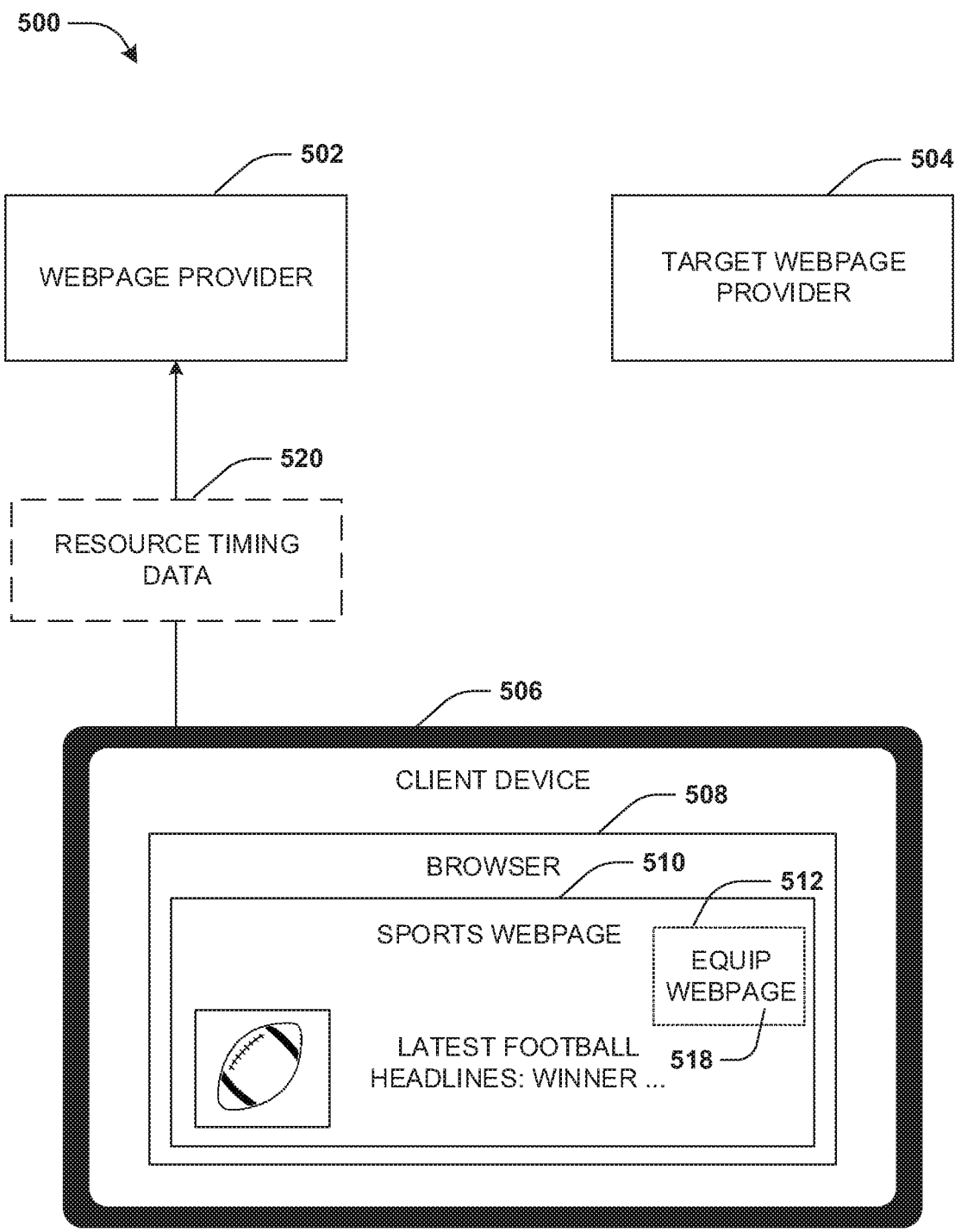
FIG. 5C is a component block diagram illustrating an example system for generating a recommendation for increasing loading time performance of a target webpage, where resource timing data is retrieved.

FIG. 5C illustrates resource timing data 520, corresponding to the loading of the equipment webpage 518 into the third party window 512, being collected. For example, the browser 508, such as a resource timing API, may be used to collect the resource timing data 520 (e.g., a window resource timing entry, for a URL of the equipment webpage 518, may comprise the resource timing data 520). In an example where a timing allow origin header is not set for the equipment webpage 518, merely a start time and an end time for a request/response lifecycle for the equipment webpage 518 may be collected as the resource timing data 520. In an example where a timing allow origin header is set for the equipment webpage 518, connection timing data, domain lookup timing data, a duration, an entry type, a fetch start, an initiator type, a URL name, redirect timing data, a request start, response timing data, or secure connection timing data may be collected as the resource timing data 520. The resource timing data 520 may be beaconed back to the webpage provider 502 for analysis. In an example, the webpage provider 502 may receive resource timing data 520 from numerous browsers of client devices that access the sports webpage 510 and load the equipment webpage 518 into instances of the third party window 512

Figure 5D:
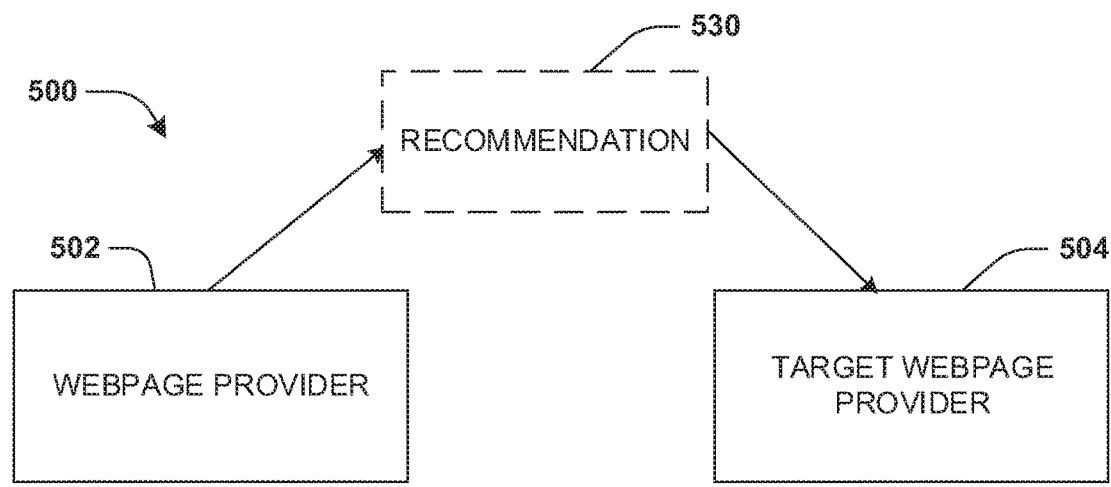
FIG. 5D is a component block diagram illustrating an example system for generating a recommendation for increasing loading time performance of a target webpage, where a recommendation is generated.
Figure 5D:
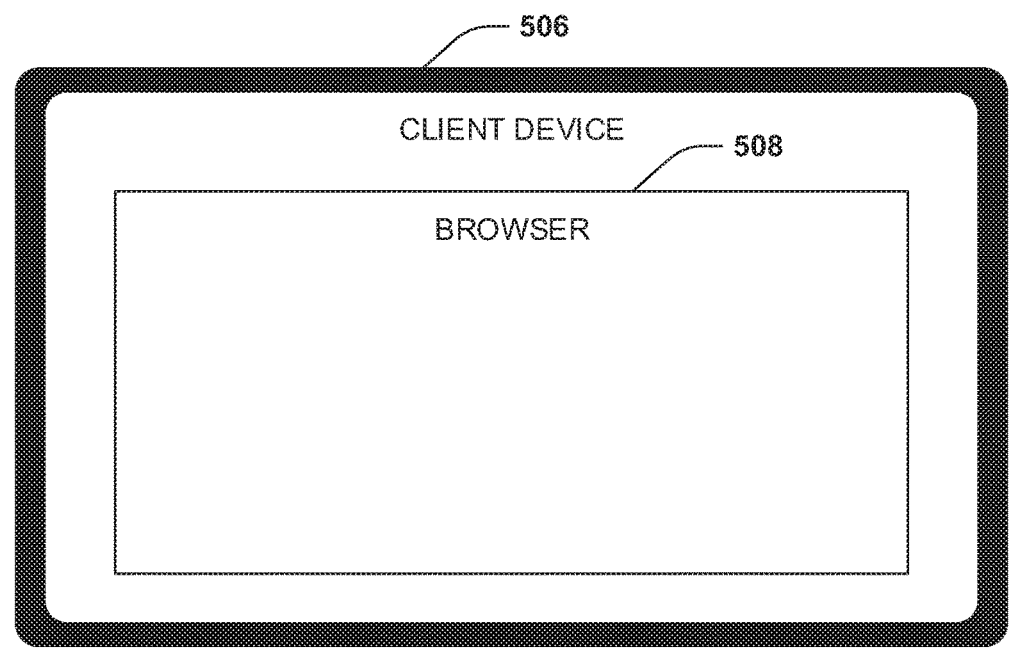

FIG. 5D illustrates the webpage provider 502 creating a recommendation 530 based upon loading time performance of the equipment webpage 518. For example, the resource timing data 520 and/or other resource timing data collected for the equipment webpage 518 may be evaluated to measure the loading time performance of the equipment webpage 518, such as how fast the equipment webpage 518 loaded or how much time each segment of loading the equipment webpage 518 took (e.g., a connection time start/end, a domain lookup time start/end, a redirect time start/end, a response time start/end, a secure connection time start/end, etc.). The recommendation 530, such as to increase resources 534 used to host the equipment webpage 518, may be created based upon the loading time performance, and provided to the target webpage provider 504.

Figure 5E:
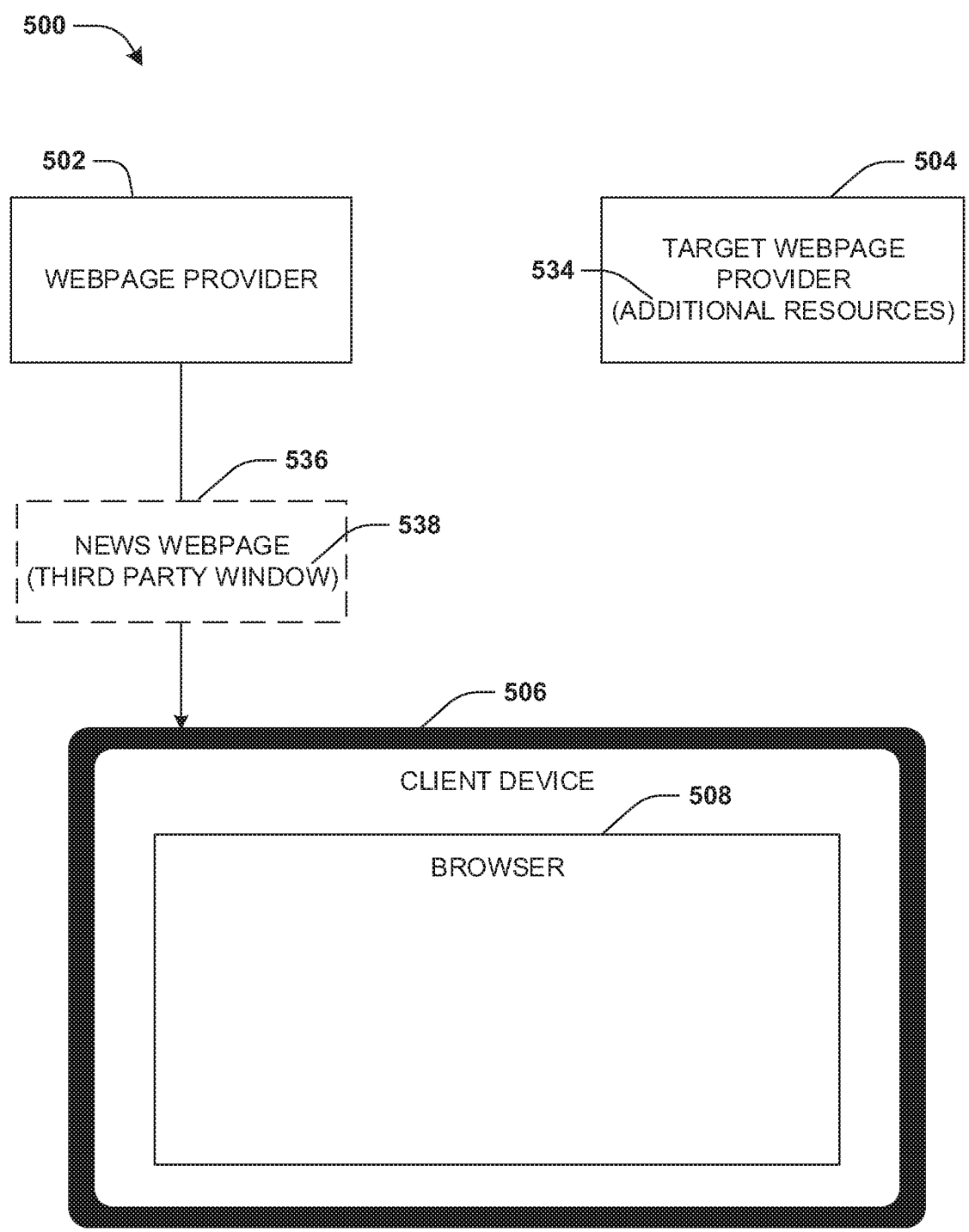
FIG. 5E is a component block diagram illustrating an example system for generating a recommendation for increasing loading time performance of a target webpage, where a browser accesses a news webpage.

FIG. 5E illustrates the user of the client device 506 using the browser 508 to access a news webpage 536 hosted by the webpage provider 502. The user may access the news webpage 536 after the target webpage provider 504 increased resources 534 used to host the equipment webpage 518. The news webpage 536 may comprise a third party window 538 specifying that the equipment webpage 512, hosted by the target webpage provider 504, is a source. In this way, the webpage provider 502 provides the news webpage 536, comprising the third party window 538, to the client device 506 for display through the browser 508.

Figure 5F:
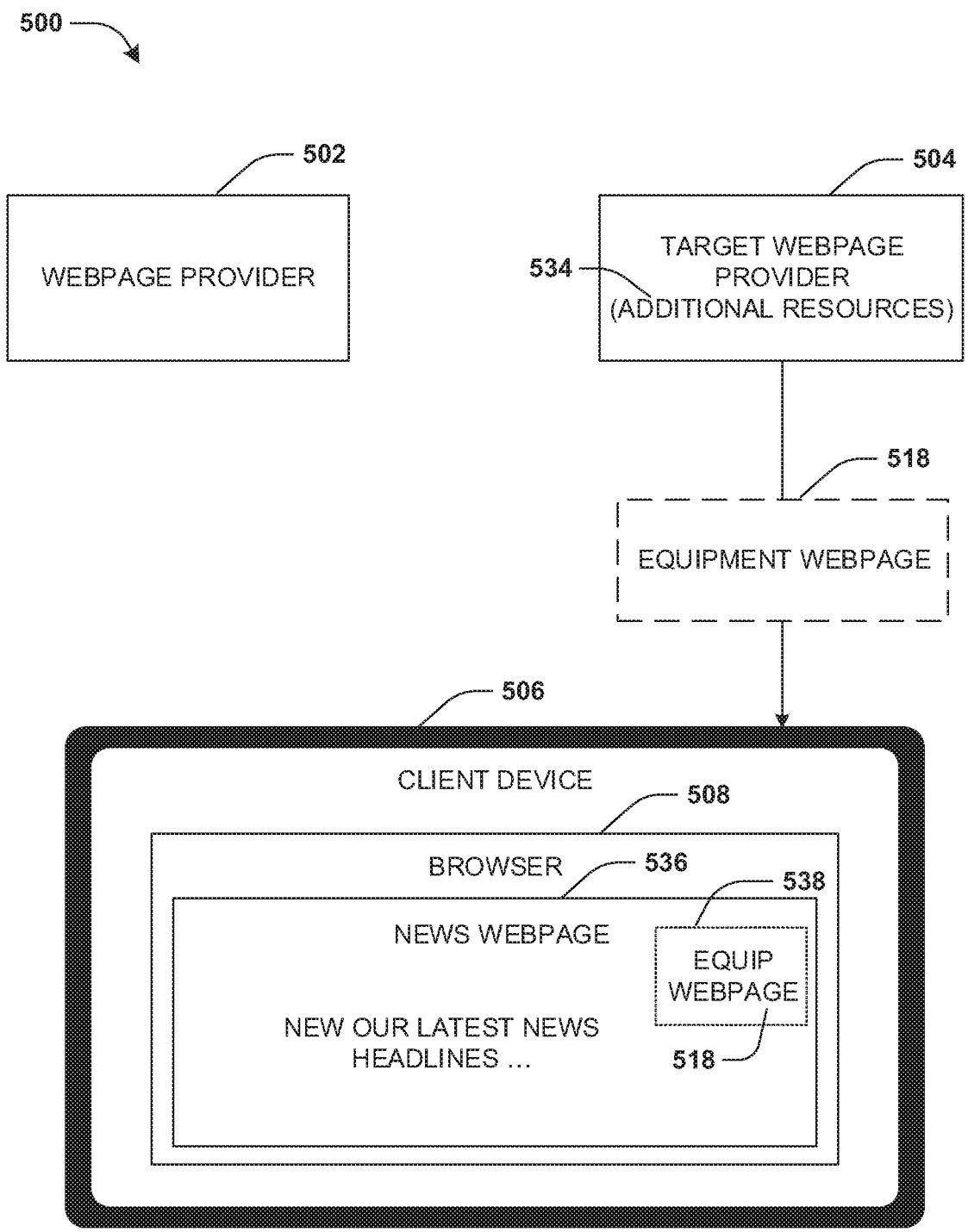
FIG. 5F is a component block diagram illustrating an example system for generating a recommendation for increasing loading time performance of a target webpage, where a browser loads a news webpage.

FIG. 5F illustrates the browser 508 displaying the news webpage 536. The browser 508 may retrieve the equipment webpage 518 from the target webpage provider 504, and may load the equipment webpage 518 into the third party window 538. In an example, the equipment webpage 518 may be provided by the target webpage provider 504 based upon the increased resources 534.

Figure 5G:
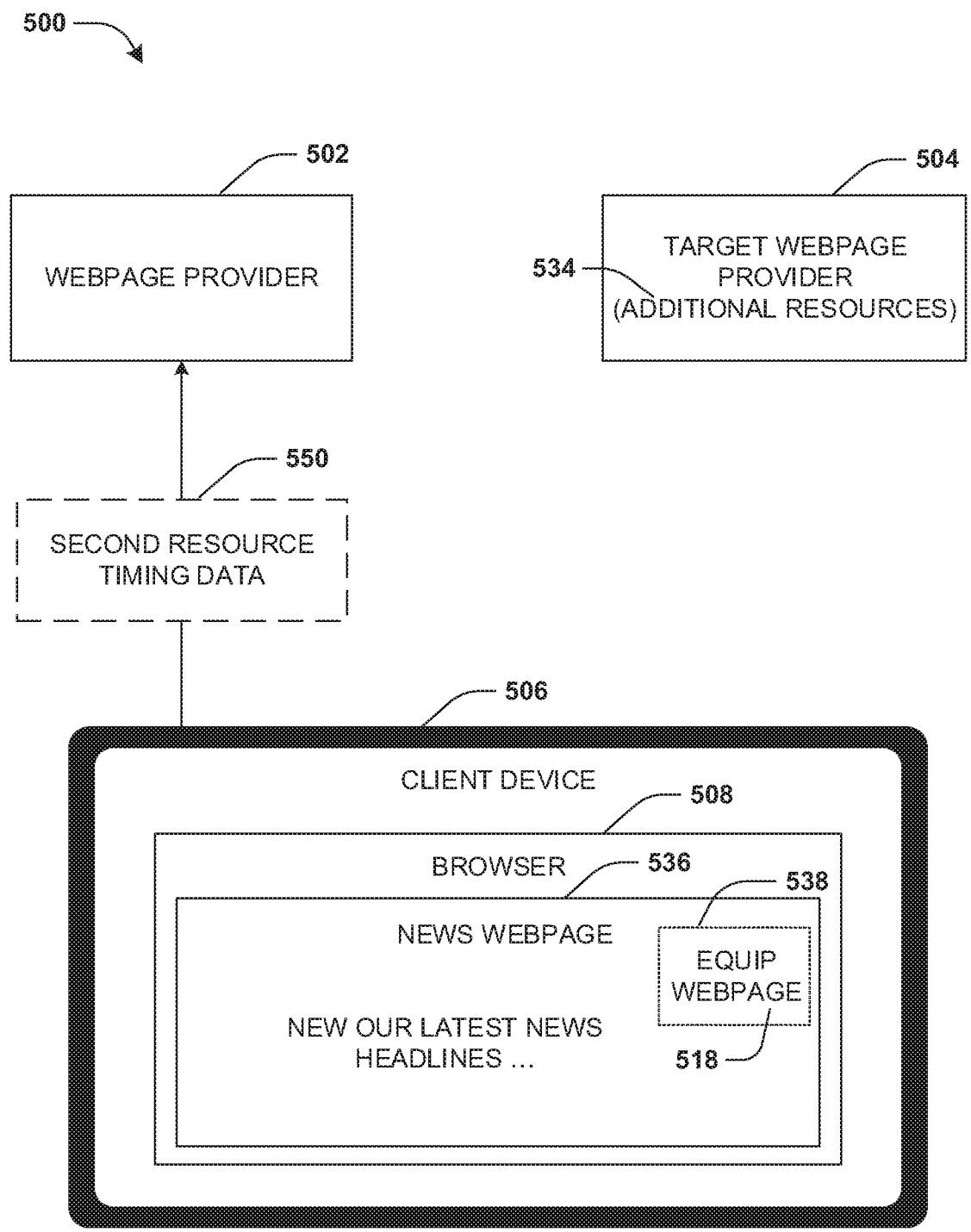
FIG. 5G is a component block diagram illustrating an example system for generating a recommendation for increasing loading time performance of a target webpage, where second resource timing data is retrieved.

FIG. 5G illustrates second resource timing data 550, corresponding to the loading of the equipment webpage 518 into the third party window 538, being collected. For example, the browser 508, such as the resource timing API, may be used to collect the second resource timing data 550 (e.g., a window resource timing entry, for the URL of the equipment webpage 518, may comprise the second resource timing data 550).

Figure 5H:
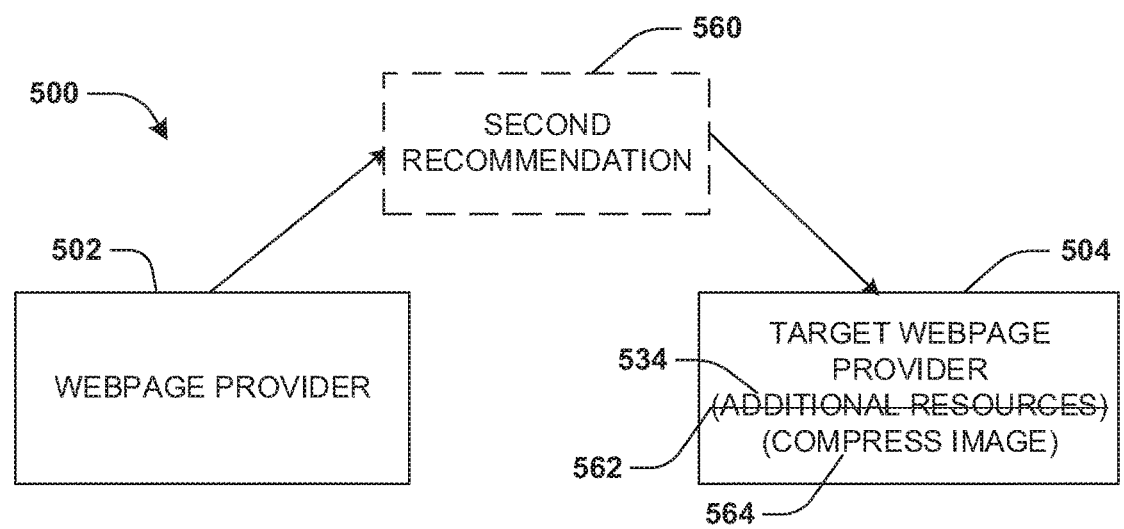
FIG. 5H is a component block diagram illustrating an example system for generating a recommendation for increasing loading time performance of a target webpage, where a second recommendation is generated.
Figure 5H:
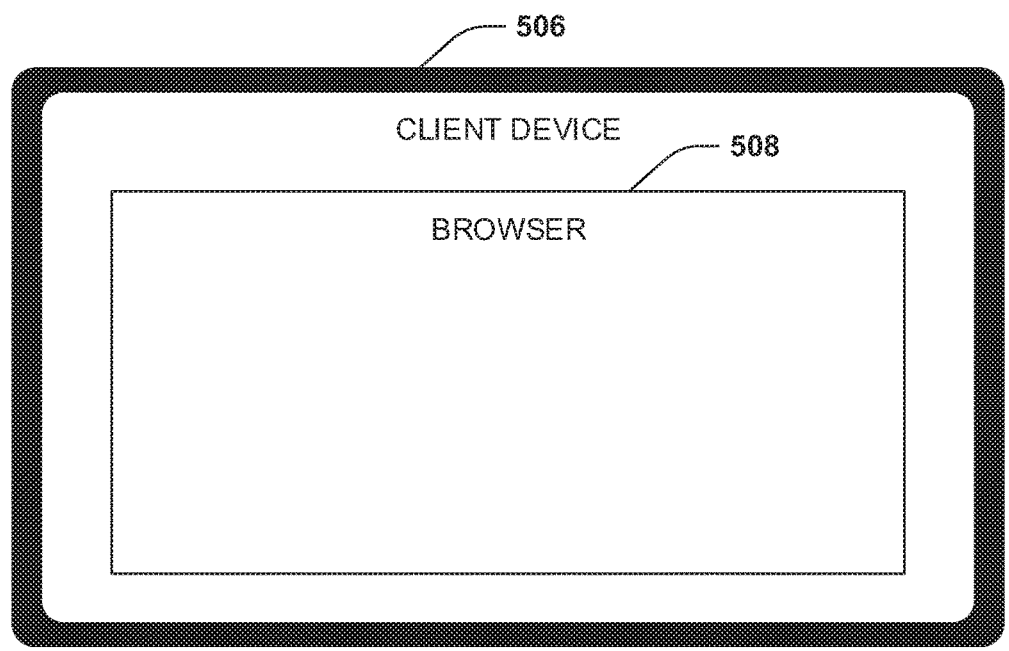

FIG. 5H illustrates the webpage provider 502 creating a second recommendation 560 based upon a comparison of the loading time performance of the equipment webpage 518 before the additional resource 534 allocation and new loading time performance of the equipment webpage 518 after the additional resource 534 allocation. For example, the second resource timing data 550 and/or other resource timing data collected for the equipment webpage 518 after the additional resource 534 allocation may be evaluated to measure the new loading time performance of the equipment webpage 518. The new loading time performance may be compared with the loading time performance of the equipment webpage 518 before the additional resources 534 were allocated to create the second recommendation 560. For example, the second recommendation 560 may specify that the additional resource 534 allocation did not improve loading time performance and thus should be unallocated 562. The second recommendation 560 may specify that an image within the equipment webpage 518 should be compressed 564 for improving loading time performance. The second recommendation 560 may be provided to the target webpage provider 504. In this way, loading time performance of the equipment webpage 518 and actions based upon such loading time performance may be iteratively performed.

Figure 5I:
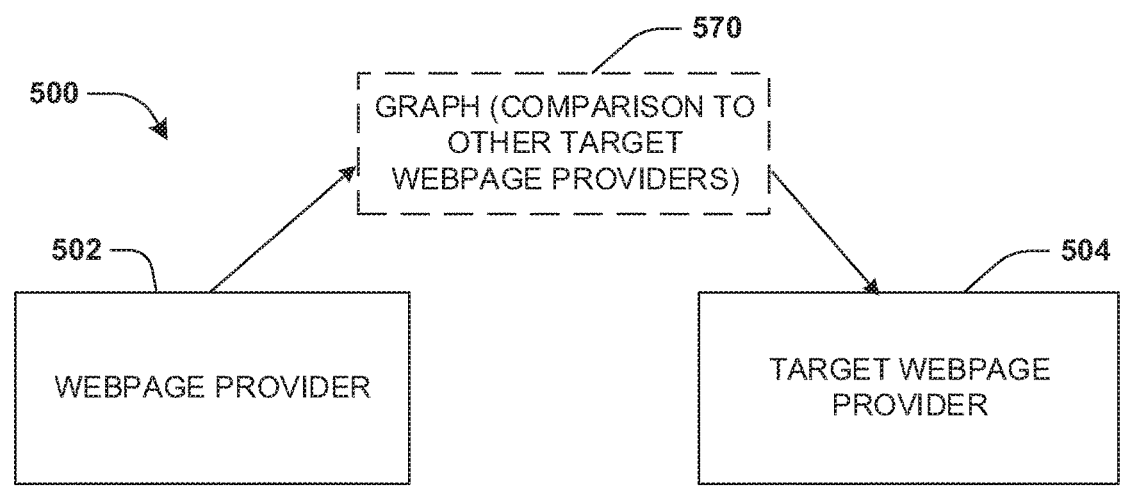
FIG. 5I is a component block diagram illustrating an example system for generating a recommendation for increasing loading time performance of a target webpage, where a graph is generated.
Figure 5I:
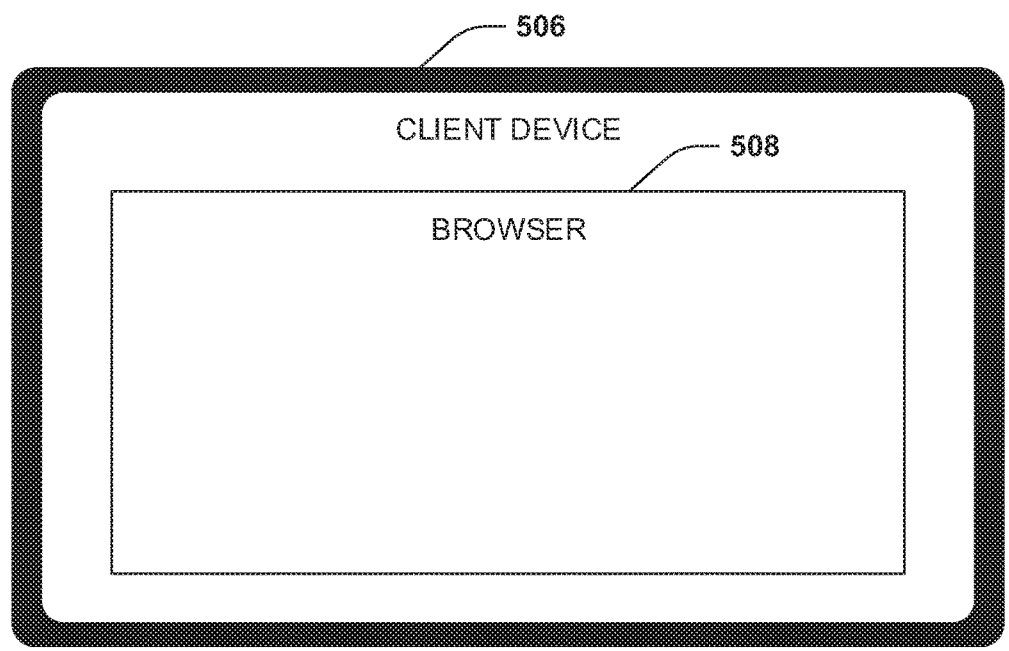

FIG. 5I illustrates the webpage provider 502 comparing the loading time performance of the target webpage provider 504 with loading time performance of other target webpage providers to create a graph 570 that may be provided to the target webpage provider 504. For example, the graph may illustrate how the loading time of the equipment webpage 518 compares to loading times of other target webpages.

Figure 6:
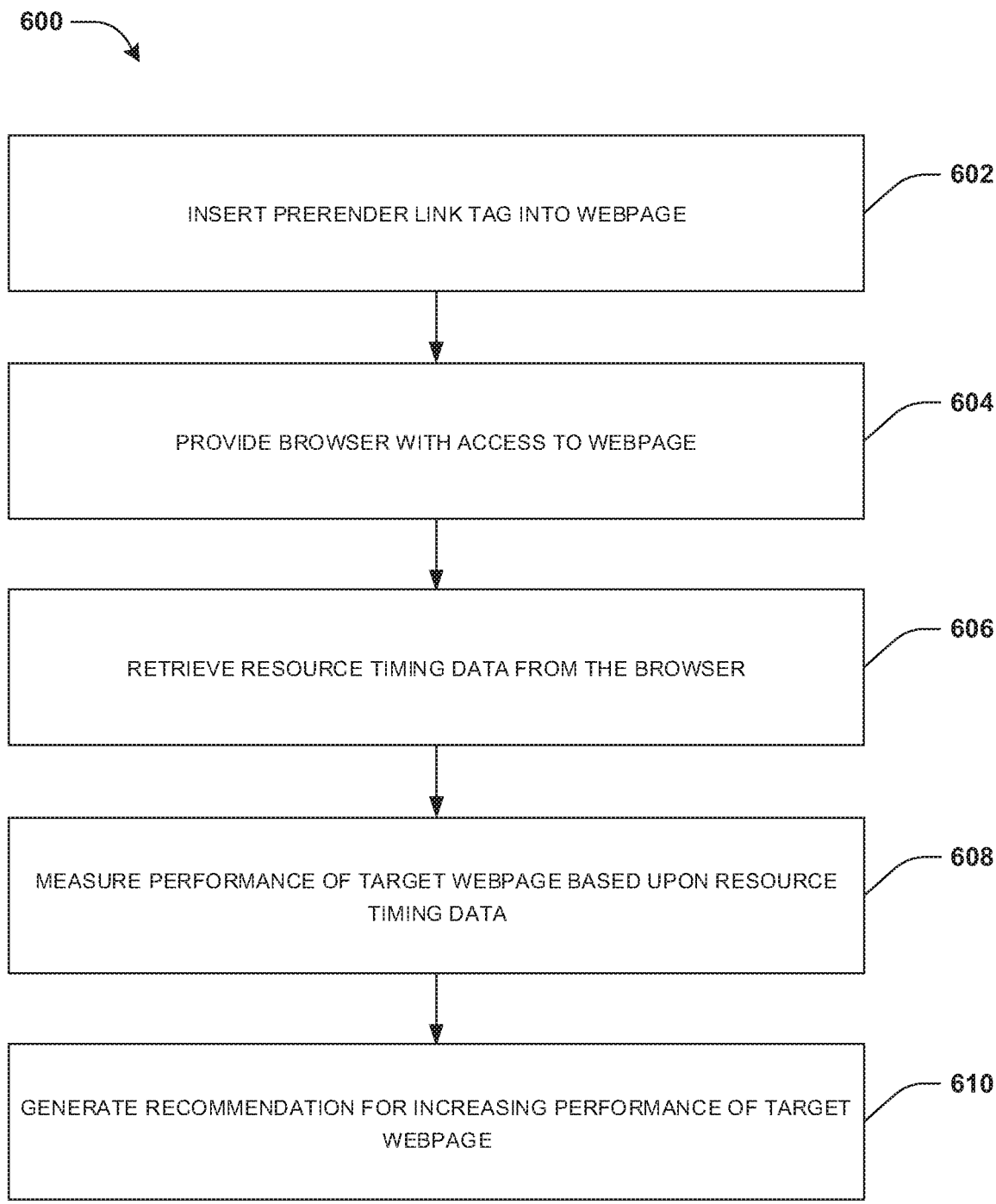
FIG. 6 is a flow chart illustrating an example method for generating a recommendation for increasing loading time performance of a target webpage.

An embodiment of generating a recommendation for increasing loading time performance of a webpage is illustrated by an example method 600 of FIG. 6. At 602, a prerender link tag may be inserted into a webpage. The prerender link tag may be an indicator to browsers that users accessing the webpage have a likelihood of navigating to a target webpage (e.g., the prerender link tag is inserted into the HTML of the webpage as an indicator that the browser should prerender the target webpage because users visiting the webpage may navigate to the target webpage). At 604, a browser of a client device may be provided with access to the webpage, such that the target webpage may be prerendered by the browser based upon the prerender tag. In an example, the prerender link tag may trigger a prerender event that will download and load (e.g., rendered) the target webpage in a background (e.g., not visible to the user) while the user is currently viewing the webpage. At 606, resource timing data, associated with the target webpage being prerendered, may be retrieved from the browser. At 608, loading time performance of the target webpage may be measured based upon the resource timing data. At 610, responsive to the loading time performance not exceeding a threshold, a recommendation for increasing the loading time performance of the target webpage may be generated and/or an action may be performed based upon the recommendation.

Figure 7:
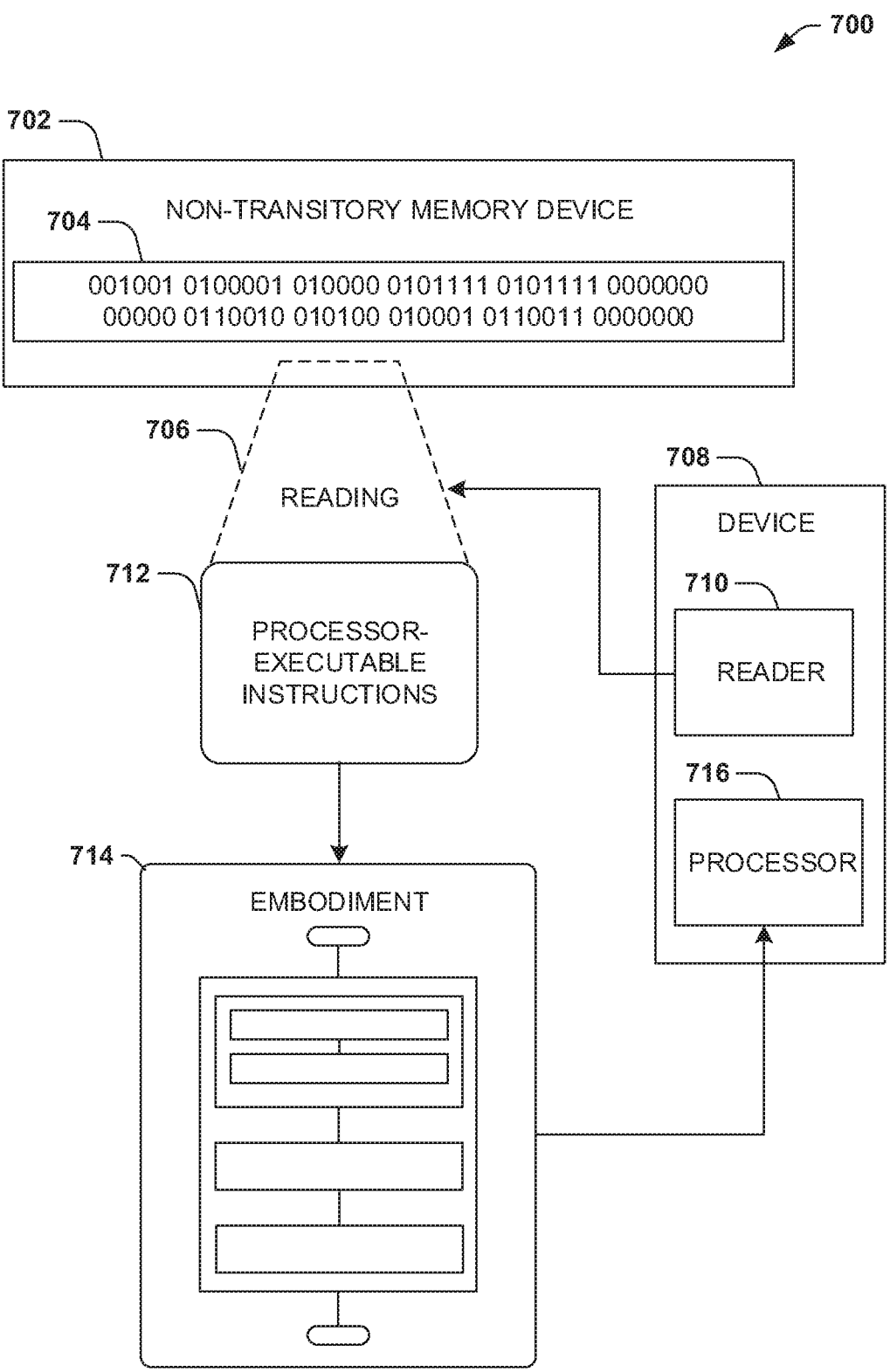
FIG. 7 is an illustration of a scenario featuring an example non-transitory memory device in accordance with one or more of the provisions set forth herein.

FIG. 7 is an illustration of a scenario 700 involving an example non-transitory memory device 702. The non-transitory memory device 702 may comprise instructions that when executed perform at least some of the provisions herein. The non-transitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example non-transitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example method 300 of FIG. 3 and/or at least some of the example method 600 of FIG. 6, for example. In some embodiments, the processor-executable instructions, when executed on the processor 716 of the device 708, are configured to implement a system, such as at least some of the example system 500 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   selectively retrieving resource timing data for a third party window specifying a target webpage as a source, the resource timing data retrieved from a browser and associated with the target webpage;
   controlling a system, based upon the resource timing data, to perform one or more actions associated with increasing a loading time performance of the target webpage;
   measuring second loading time performance of a second target webpage based upon second resource timing data generated from the second target webpage being loaded into instances of a second third party window by client devices; and
   generating a recommendation, associated with an action that was performed in response to a prior recommendation, by comparing the second loading time performance of the second target webpage with at least one loading time performance of the target webpage.

2. The method of claim 1, wherein the resource timing data comprises at least one of connection timing data, domain lookup timing data or a duration.

3. The method of claim 1, wherein the resource timing data comprises at least one of an entry type, a fetch start, an initiator type or a uniform resource locator (URL) name.

4. The method of claim 1, wherein the resource timing data comprises at least one of redirect timing data or a request start.

5. The method of claim 1, wherein the resource timing data comprises at least one of response timing data or secure connection timing data.

6. The method of claim 1, wherein the recommendation specifies that the action that was performed in response to the prior recommendation should be retained.

7. The method of claim 1, wherein the recommendation specifies that the action that was performed in response to the prior recommendation should be undone.

8. The method of claim 1, wherein the third party window comprises an iFrame.

9. The method of claim 1, wherein the third party window comprises a web view.

10. The method of claim 1, comprising:
    applying a hidden style to the third party window.

11. The method of claim 1, comprising:
    receiving a plurality of resource timing data from browsers of one or more client devices; and
    aggregating the plurality of resource timing data to measure the at least one loading time performance of the target webpage.

12. The method of claim 1, wherein the recommendation specifies that an additional action should be performed.

13. The method of claim 1, comprising:
    generating a graph based upon the comparison.

14. The method of claim 1, comprising generating a recommendation for the target webpage, wherein the recommendation specifies a second action to perform to decrease a loading time of the target webpage.

15. The method of claim 1, wherein the resource timing data comprises at least one of a start time or an end time for a request/response lifecycle for the target webpage.

16. The method of claim 1, wherein the resource timing data comprises a start time and an end time for a request/response lifecycle for the target webpage based upon a timing allow origin header not being set for the target webpage.

17. The method of claim 1, wherein the resource timing data comprises secure connection timing data based upon a timing allow origin header being set for the target webpage.

18. A computing device comprising:
    a memory containing machine readable medium comprising machine executable code having stored thereon instructions for performing a method; and
    a processor coupled to the memory, the processor configured to execute the machine executable code to cause the processor to:
        retrieve resource timing data, associated with a target webpage being loaded into a third party window, from a browser;
        perform, in response to a prior recommendation, an action to either modify the target webpage, adjust a resource allocation for providing the target webpage to one or more browsers, or adjust how the target webpage is served to the one or more browsers based upon the resource timing data;
        measure second loading time performance of a second target webpage based upon second resource timing data generated from the second target webpage being loaded into instances of a second third party window by client devices; and
        generate a recommendation, associated with the action that was performed in response to the prior recommendation, by comparing the second loading time performance of the second target webpage with at least one loading time performance of the target webpage.

19. The computing device of claim 18, wherein the recommendation specifies that the action should be undone, that the action should be retained, or that an additional action should be performed.

20. A non-transitory machine readable medium having stored thereon instructions for performing a method comprising machine executable code which when executed by at least one machine, causes the at least one machine to:
    selectively retrieve resource timing data for a third party window specifying a target webpage as a source, the resource timing data retrieved from a browser and associated with the target webpage;
    control a system, based upon the resource timing data, to perform one or more actions;

measure second loading time performance of a second target webpage based upon second resource timing data generated from the second target webpage being loaded; and generate a recommendation, associated with an action that was performed in response to a prior recommendation, by comparing the second loading time performance of the second target webpage with at least one loading time performance of the target webpage.

\* \* \* \* \*